Patented Sept. 18, 1928.

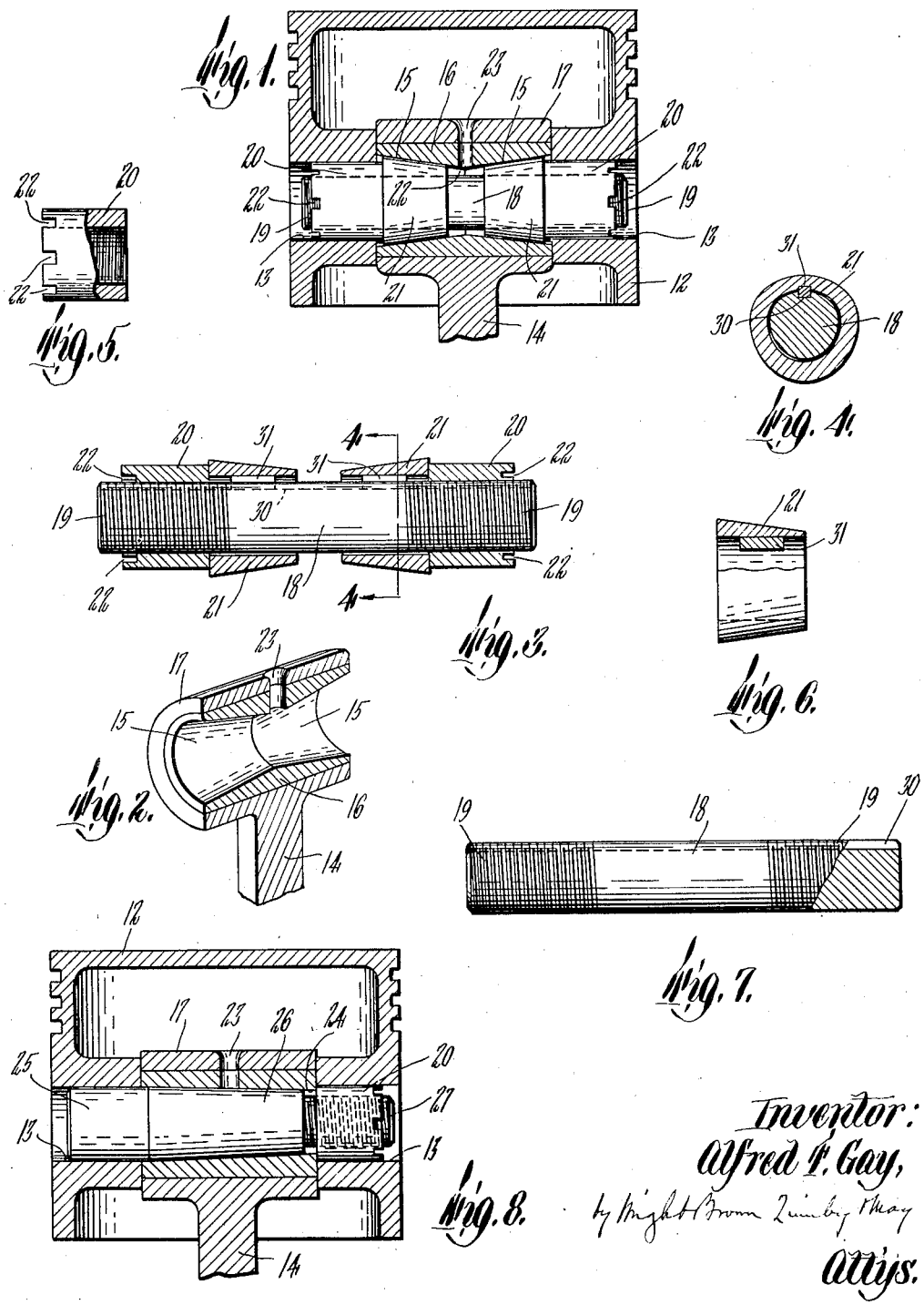

1,684,862

UNITED STATES PATENT OFFICE.

ALFRED F. GAY, OF BROCKTON, MASSACHUSETTS, ASSIGNOR TO HENRY J. LUPIEN, OF BROCKTON, MASSACHUSETTS.

JOINT FOR PISTONS AND CONNECTING RODS, ETC.

Application filed December 3, 1927. Serial No. 237,436.

This invention relates to a jointed structure which may include the piston of an engine of the internal combustion, or other type, a connecting-rod connecting the piston with a crank-shaft, and a wrist-pin journaled at its ends in bearings in the piston and hingedly connecting the rod with the piston, the wrist-pin having a journal portion rotatable in a bearing in the head portion of the connecting-rod.

The chief object of the invention is to provide improved means for maintaining a close fit of the journal portion of the wrist-pin on the bearing therefor in the connecting-rod, by taking up wear of said journal portion and bearing.

Other objects will appear hereinafter.

Of the accompanying drawings forming a part of this specification,—

Figure 1 is a sectional view of a piston and a portion of a connecting-rod, and a side view of a wrist-pin connecting the piston and rod.

Figure 2 is a fragmentary perspective sectional view, showing the head portion of the connecting-rod.

Figure 3 shows the wrist-pin shown by Figure 1, partly in elevation and partly in section.

Figure 4 is a section on line 4—4 of Figure 3.

Figure 5 shows partly in section, one of the independently formed cylindrical bearings shown by Figures 1 and 3.

Figure 6 shows partly in section, one of the members of the tapered bearing shown by Figures 1 and 2.

Figure 7 is a side view of the body portion of the wrist-pin, shown by Figures 1, 3 and 4.

Figure 8 is a view similar to Figure 1, showing a modification.

The same reference characters indicate the same parts in all of the figures.

I will first describe the jointed structure shown by Figure 1, and the elements thereof shown by Figures 2 to 7, the same constituting the preferred embodiment of the invention.

The piston 12 may be of any suitable form, and has two alined cylindrical wrist-pin bearings 13, at diametrically opposite points, as usual. The connecting-rod 14 may be connected at one end with a crank-shaft (not shown) by any suitable means, and is provided at its opposite end with a wrist-pin bearing, composed of two oppositely tapered portions 15, preferably formed on a bushing 16, fixed in an orifice in the head 17 of the connecting-rod.

The wrist-pin is of composite construction and includes a cylindrical body member 18, having screw-threaded end portions 19, extending into the piston bearings 13. On the threaded end portions of the body member 18, are independently formed journals 20, fitting the piston bearings 13, and internally threaded, so that they constitute adjusting nuts engaged with and rotatable on the threaded end portions 19.

The wrist-pin includes also a tapered journal, composed of two independent annular members 21, fitting the tapered portions 15 of the bearing in the connecting-rod, and abutting the cylindrical journals 20. The members 21 are adjustable by rotation of the journals 20 on the wrist-pin body 18, to compensate for wear, the said journals having slots 22 in their outer ends which are engageable by a suitable wrench.

It will now be seen that the cylindrical journals 20 are accessible from opposite sides of the piston, so that each may be conveniently adjusted by a wrench inserted in one of the usual cylindrical bearings 13 in the piston, no separation of the composite wrist-pin from the piston and connecting-rod being required. The cylindrical journals 20, after being adjusted, are free from liability to be accidentally displaced, so that they confine the tapered members 21 in any position to which they may be adjusted.

The annular members 21 are spaced apart, so that their inner ends form opposite ends of an annular oil space 22, communicating with and adapted to supply oil to the crevice between the tapered bearing in the connecting-rod, and the tapered journal on the wrist-pin. Oil splashed into the hollow piston from the crank case of the engine, enters the space 22 through an oil duct 23 in the connecting-rod.

A modification is shown by Figure 8, which shows the piston-rod head 17 provided with a tapered bearing 24, tapered in one direction only. The wrist-pin is composed of a one-piece body member, which includes a cylindrical journal 25, fitting and rotatable in one of the piston bearings 13, a tapered journal 26, tapered in one direction only, and fitting the tapered bearing 24, and a reduced threaded end portion 27, projecting into the other piston bearing 13. In this modification only one separately formed internally threaded cylindrical journal 20 is employed, this being engaged with and rotatable on the reduced end portion 27. The inner end of the journal 20 abuts one end of the tapered bearing 24 in the connecting-rod, and the arrangement is such that rotation of the journal 20 causes an endwise adjustment of the entire body member of the wrist-pin including the tapered journal 26.

It is obvious that the wrist-pin characterized as described and shown, may be used as an element of jointed structures for other purposes.

To prevent rotation of the journal members 21 on the body member 18, I provide the body member with a longitudinal keyway 30, in which keys 31, fixed to the journal members 21, are adapted to slide.

I claim:

1. A joint of the character stated, comprising a tapered wrist-pin bearing in a connecting-rod, and a composite wrist-pin having cylindrical journals fitting the cylindrical wrist-pin bearings in a piston, and a tapered journal fitting the tapered bearing in the connecting-rod, said joint including manually operable means for longitudinally adjusting, and confining in any adjusted position, the tapered journal portion of the wrist-pin, to compensate for wear.

2. A joint of the character stated, comprising a tapered wrist-pin bearing in a connecting-rod, and a composite wrist-pin having cylindrical journals fitting the cylindrical wrist-pin bearings in a piston, and a tapered journal fitting the tapered bearing in the connecting-rod, at least one of the cylindrical bearings on the wrist-pin being separately formed and internally threaded to constitute an adjusting nut engaged with a threaded member of the structure, and abutting another member thereof, the arrangement being such that rotation of the nut longitudinally adjusts the tapered journal, to compensate for wear.

3. A joint of the character stated, comprising a connecting-rod having a wrist-pin bearing composed of two oppositely tapered portions, and a composite wrist-pin including a cylindrical body member having threaded end portions, independently formed cylindrical journals fitting cylindrical bearings in the piston, and internally threaded so that they constitute adjusting nuts engaged with and rotatable on the said threaded end portions, and a tapered journal composed of two independent annular members fitting the oppositely tapered portions of the connecting-rod bearing, and abutting the cylindrical journals, the said annular members being adjustable by rotation of the cylindrical journals on the wrist-pin body member, to compensate for wear.

4. A joint as specified by claim 3, the annular members of the tapered journal being spaced apart to form opposite ends of an oil space communicating with the tapered bearing and tapered journal, the connecting-rod being provided with an oil duct communicating with said space.

5. A joint as specified by claim 3, the wrist-pin body member being provided with a longitudinal keyway, and the members of the tapered wrist-pin journal being provided with keys entering and slidable in said keyway, so that rotation of said members on the wrist-pin body member is prevented.

6. A composite wrist-pin including a cylindrical body member having threaded end portions, independently formed cylindrical journals internally threaded, so that they constitute adjusting nuts engaged with and rotatable on the threaded end portions, and a tapered journal composed of two independent annular members having oppositely tapered peripheries and abutting the cylindrical journals, said annular members being adjustable lengthwise of the body member by rotation of the cylindrical journals, to compensate for wear of the annular members.

7. A composite wrist-pin including a cylindrical body member having threaded end portions, independently formed cylindrical journals internally threaded, so that they constitute adjusting nuts engaged with and rotatable on the threaded end portions, and a tapered journal composed of two independent annular members having oppositely tapered peripheries and abutting the cylindrical journals, said annular members being adjustable lengthwise of the body member by rotation of the cylindrical journals, to compensate for wear of the annular members, the outer ends of the cylindrical journals being formed to engage a wrench whereby they may be rotated.

8. A composite wrist-pin including a cylindrical body member having threaded end portions, independently formed cylindrical journals internally threaded, so that they constitute adjusting nuts engaged with and rotatable on the threaded end portions, and a tapered journal composed of two independent annular members having oppositely tapered peripheries and abutting the cylindrical journals, said annular members being adjustable lengthwise of the body member by rotation of the cylindrical journals, to compensate for wear of the annular members, the body member being provided with a longitudinal keyway, and the annular members with keys slidable in the keyway.

In testimony whereof I have affixed my signature.

ALFRED F. GAY.